US009351133B2

(12) United States Patent
Offen et al.

(10) Patent No.: US 9,351,133 B2
(45) Date of Patent: May 24, 2016

(54) SYSTEMS AND METHODS FOR MANAGING INCOMING CALLS (71) Applicants: David William Offen, Aurora (CA); Daniel Patrick Shea, Richmond Hill (CA); Alberto Leon-Garcia, Toronto (CA)

(72) Inventors: David William Offen, Aurora (CA); Daniel Patrick Shea, Richmond Hill (CA); Alberto Leon-Garcia, Toronto (CA)

(*) Notice: Subject to any disclaimer, the term of this patent is extended or adjusted under 35 U.S.C. 154(b) by 0 days.

(21) Appl. No.: 14/465,367

(22) Filed: Aug. 21, 2014

(65) Prior Publication Data
US 2015/0054910 A1 Feb. 26, 2015

Related U.S. Application Data (60) Provisional application No. 61/868,260, filed on Aug. 21, 2013.

(51) Int. Cl.
*H04M 1/56* (2006.01)
*H04M 15/06* (2006.01)
*H04M 3/42* (2006.01)
*H04W 4/12* (2009.01)
*H04M 3/436* (2006.01)
(Continued)

(52) U.S. Cl.
CPC ............ *H04W 4/12* (2013.01); *H04M 3/42059* (2013.01); *H04M 3/436* (2013.01); *H04M 3/4365* (2013.01); *H04N 7/141* (2013.01); *H04W 4/16* (2013.01); *H04M 3/42068* (2013.01)

(58) Field of Classification Search
CPC ...................... H04M 3/42059; H04M 3/42068; H04M 3/42102; H04M 3/4211; H04M 3/428; H04M 3/4281; H04M 3/4283; H04M 3/4285; H04M 3/4286; H04M 3/4288; H04M 3/436; H04M 3/4365; H04N 7/141; H04W 4/12; H04W 4/16
USPC ............ 348/14.02; 379/93.35, 215.01, 88.19, 379/88.21, 93.03, 127.01, 142.05, 142.08, 379/161, 201.01, 201.02, 208.01, 215; 455/415
See application file for complete search history.

(56) References Cited

U.S. PATENT DOCUMENTS 5,692,033 A * 11/1997 Farris ...................... H04M 3/48
379/209.01
6,192,218 B1 * 2/2001 Laufmann .............. G08B 5/227
340/7.51
(Continued)

FOREIGN PATENT DOCUMENTS

WO 2007098508 A1 8/2007

OTHER PUBLICATIONS

Patent Cooperation Treaty, Written Opinion and International Search Report dated Oct. 28, 2014, issued on PCT Apllication No. PCT/CA2014/000634.

*Primary Examiner* — Khai N Nguyen
(74) *Attorney, Agent, or Firm* — Norton Rose Fulbright Canada (57) ABSTRACT

A system is provided that provides for the prioritization of incoming calls to a communications device based on respective caller profiles. Each profile may include a caller priority value. The system may prioritize an incoming call based on the priority value. The priority value may be updated manually or automatically in accordance with a variety of factors. While the communications device receive an incoming call while an existing call is active, the communications device may request a call management command at the communications device or provide a notification that an incoming call has been received and is pending in accordance with the respective caller profile.

20 Claims, 6 Drawing Sheets

(51) Int. Cl.
*H04N 7/14* (2006.01)
*H04W 4/16* (2009.01)

(56) References Cited

U.S. PATENT DOCUMENTS

| | | | | |
|---|---|---|---|---|
| 6,327,364 | B1* | 12/2001 | Shaffer | H04M 3/36 |
| | | | | 379/219 |
| 6,356,622 | B1* | 3/2002 | Hassell | H04M 3/12 |
| | | | | 379/1.01 |
| 6,628,763 | B1* | 9/2003 | Mani | H04Q 3/0016 |
| | | | | 379/142.08 |
| 7,209,475 | B1* | 4/2007 | Shaffer | H04M 3/4285 |
| | | | | 370/355 |
| 8,223,961 | B2* | 7/2012 | Chew | H04M 1/6041 |
| | | | | 379/373.01 |
| 8,259,918 | B2* | 9/2012 | Moon | H04M 3/4211 |
| | | | | 379/201.02 |
| 8,644,484 | B2* | 2/2014 | Fulton | H04M 3/42263 |
| | | | | 379/201.01 |
| 8,705,711 | B2* | 4/2014 | Hamerschlag | H04M 3/493 |
| | | | | 379/88.17 |
| 2003/0133558 | A1* | 7/2003 | Kung | H04L 12/2801 |
| | | | | 379/215.01 |
| 2004/0209606 | A1 | 10/2004 | Cleary et al. | |
| 2005/0041793 | A1* | 2/2005 | Fulton | H04M 3/42263 |
| | | | | 379/211.01 |
| 2006/0034445 | A1* | 2/2006 | Shelton | H04M 3/523 |
| | | | | 379/266.01 |
| 2007/0206736 | A1* | 9/2007 | Sprigg | H04M 3/42042 |
| | | | | 379/88.21 |
| 2008/0032679 | A1* | 2/2008 | Purontaus | H04M 3/436 |
| | | | | 455/417 |
| 2008/0205620 | A1* | 8/2008 | Odinak | H04M 3/4285 |
| | | | | 379/215.01 |
| 2008/0260138 | A1* | 10/2008 | Chen | H04M 3/5238 |
| | | | | 379/215.01 |
| 2009/0232296 | A1 | 9/2009 | Jaiswal et al. | |
| 2010/0310063 | A1* | 12/2010 | Moon | H04M 3/4211 |
| | | | | 379/215.01 |
| 2011/0190012 | A1* | 8/2011 | Williams | H04W 4/12 |
| | | | | 455/466 |
| 2011/0286591 | A1* | 11/2011 | Fulton | H04M 3/42263 |
| | | | | 379/201.12 |
| 2011/0319104 | A1* | 12/2011 | Williams | H04M 1/72552 |
| | | | | 455/466 |
| 2012/0250844 | A1* | 10/2012 | Meriaz | H04M 3/42 |
| | | | | 379/93.17 |
| 2012/0281820 | A1* | 11/2012 | Hamerschlag | H04M 3/493 |
| | | | | 379/88.17 |
| 2012/0295617 | A1* | 11/2012 | Anchan | H04W 76/005 |
| | | | | 455/435.1 |
| 2013/0216039 | A1* | 8/2013 | Mairs | H04M 3/424 |
| | | | | 379/265.13 |
| 2014/0063175 | A1* | 3/2014 | Jafry | H04M 1/67 |
| | | | | 348/14.02 |
| 2014/0112457 | A1* | 4/2014 | Xing | H04M 3/436 |
| | | | | 379/32.01 |

* cited by examiner

FIG. 1

| Priority (profile) | Action |
|---|---|
| 1 (High) | Custom ring tone, if no answer, custom greeting for that caller, "I will try and get to you in 30 secs if not please leave a message, put on hold, if no answer in 30 secs, send to VM |
| 2 | Custom ring tone, if no answer, custom greeting for that caller, send to VM |
| 3 | Standard ring tone, Custom greeting for that caller, return call in 5 mins, send to VM |
| 4 | Standard ring tone, Custom greeting for that caller, return when available, send to VM |
| 5 | Standard ring tone, Standard greeting, send to voice mail |
| 6 | |
| 7 (Low) | |

| Priority (profile) | Action |
| --- | --- |
| 1 (High) | Special tone, custom greeting, 10 sec delay, $1^{st}$ call on hold, answer $2^{nd}$ call automatically |
| 2 | Special tone, custom greeting, 10 sec delay, 3 way conference call automatic |
| 3 | Give 2nd caller option to execute Priority 1, special tone, 10 sec delay, if not, choose Priority 4-7 |
| 4 | Give $2^{nd}$ caller option to execute Priority 2, special tone, 10 sec delay, if not, choose Priority 5-7 |
| 5 | Play recorded message, important call, hold for 30 secs, then take call |
| 6 | Play recorded message, important call, say I will call back in 5 mins, send to voicemail |
| 7 (Low) | Play recorded message, important call, say will call back, send to voicemail |

SYSTEMS AND METHODS FOR MANAGING INCOMING CALLS

CROSS-REFERENCE TO RELATED APPLICATIONS

This application claims all benefits, including priority, to U.S. Provisional Patent Application Ser. No. 61/868,260, filed Aug. 21, 2013.

FIELD OF THE INVENTION

The present invention relates generally to telephony. The present invention further relates to methods and systems for managing incoming calls to a communications device.

BACKGROUND OF THE INVENTION

A communications device, such as a mobile phone, may receive a telecommunications or phone call from another communications device. Various technologies exist for managing incoming calls. For example, "call waiting" functionality is available on many communications devices. In "call waiting" a user may receive a second call while already maintaining an active first call at the communications device. The communications device may provide an audible notification that the second call is coming in, and the user may toggle between which of the calls is active, placing the other caller on hold.

Another example of a technology for managing incoming calls is a "conference call" or "teleconference" where multiple calls may be joined together to allow the user and each of the first and second callers to all talk together in the same "conference".

There is a need to provide additional ways of managing incoming calls at a communications device to assist the user in prioritizing the incoming calls.

SUMMARY OF THE INVENTION

In accordance with an aspect of the present invention there is provided a method, performed by one of a communications device and a computer server, the communications device associated with a user and in communication with the computer server over a communications network, comprising: receiving an incoming call at the communications device from a second communications device, the incoming call comprising caller identity information; determining a correspondence between the caller identity information and a respective caller profile; transmitting a predetermined message to the second communications device requesting an indication of incoming call importance, the predetermined message based at least partly on the respective caller profile; in accordance with a comparison of incoming call importance data received from the second communications device with predetermined call priority data, and based at least partly on the respective caller profile, prioritizing the incoming call in a call queue.

In accordance with another aspect of the present invention, there is provided a method, performed by one of a communications device and a computer server, the communications device associated with a user and in communication with the computer server over a communications network, comprising: receiving an incoming call at the communications device from a second communications device, the incoming call comprising caller identity information; determining a correspondence between the caller identity information and a respective caller profile; transmitting a predetermined on-hold message to the second communications device, the predetermined on-hold message including an indication of a predetermined on-hold time period, the predetermined on-hold message and the predetermined on-hold time period each based at least partly on the respective caller profile; providing a notification at the communications device prior to expiration of the predetermined on-hold time period, based at least partly on the predetermined on-hold time period; in accordance with call management information data received at the communications device, transmitting a second predetermined on-hold message to the second communications device.

In accordance with another aspect of the present invention, there is provided a method, performed by one of a communications device and a computer server, the communications device associated with a user and in communication with the computer server over a communications network, comprising: receiving an incoming call at the communications device from a second communications device, the incoming call comprising caller identity information; determining a correspondence between the caller identity information and a respective caller profile; transmitting a predetermined on-hold message to the second communications device based at least partly on the respective caller profile; providing a notification of the incoming call at the communications device; in accordance with call management information data received at the communications device, transmitting a second predetermined on-hold message to the second communications device.

In accordance with another aspect of the present invention, there is provided a method, performed by one of a communications device and a computer server, the mobile device associated with a user and in communication with the computer server over a communications network, comprising: receiving an incoming call at the communications device from a second communications device, the incoming call comprising caller identity information; determining a correspondence between the caller identity information and a respective caller profile; transmitting a predetermined on-hold message to the second communications device, the predetermined on-hold message based at least partly on the respective caller profile; receiving an indication of on-hold preference data from the second communications device; providing a notification at the communications device of the on-hold preference data; prioritizing the incoming call in a call queue based at least partly on the on-hold preference data and the respective caller profile.

In accordance with another aspect of the present invention, there is provided a non-transitory computer readable medium tangibly embodying code that, when executed by a processor, causes the processor to carry out the method of the present invention.

In accordance with another aspect of the present invention, there is provided a system comprising a communications device and a computer server, the communications device associated with a user and in communication with the computer server over a communications network, one of the communications device and the computer server being configured to carry out the method of the present invention.

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

In various aspects, the disclosure provides a system and method for prioritizing incoming calls to a communications device based on a profile for the respective caller. Either the communications device itself may be configured to respond with a predetermined response or by performing at least one predetermined action, or a computer server in communication with the communications device may direct the communications device with the predetermined response or to perform the at least one predetermined action. For simplicity, in this disclosure the "system" may refer to either (i) the communications device alone where no computer server is used; or (ii) to one of the communications device and the computer server where the computer server directs the communications device how to handle incoming calls. An incoming call as described herein, may refer to an audio-only call or to a video call, which may include both audio and video data.

In response to receiving an incoming call, the system may be configured to respond with a predetermined response or by performing at least one predetermined action. For example, the respective caller profile may include instructions directing the system to interrupt a call in progress, join a call in progress, temporarily wait for the call in progress to complete, or play a predetermined message optionally personalized for the respective caller. The system may respond based on a predetermined profile both where there is already an active call at the communications device prior to receiving another incoming call, and for an incoming call where there is no other active call. The predetermined message may be a message prerecorded by the user, a message generated optionally using data from the respective caller profile, or some combination of prerecorded and generated message.

The system may operate together with or distinctly from other known calling features such as call waiting, call display (also known as caller identification ("ID")), and conference calling. Caller ID allows the system to determine some identification data of the caller. The identification data may include a caller's name, phone number, or other information.

Where a profile does not yet exist for a respective caller the system may generate a default profile, optionally pre-populating the profile with predetermined default settings. Whether a new caller or a caller known to the user, the system would make use of the profile to categorize and prioritize the call which determines how the call is handled.

In addition to responding based on the caller profile, optionally the system may be pre-empted, overridden, or otherwise modified by manual input received from a user of the communications device either before or during a call. For example, upon receiving a call from a respective caller, the system may prompt the user to determine the system response or action. In so doing, the system may optionally present a recommendation in accordance with the respective caller profile if a corresponding recommendation is available in the profile. Further optionally, a predetermined time limit may be configured to receive the user input in response to a call. If no user input is received within the time limit, the system may be configured to respond in accordance with the recommendation or in accordance with other respective settings in the profile. In the case of an audio call, the prompt to the user may include: an audio tone played through the earpiece, speaker, or bluetooth audio device to the user; a vibration or other tactic feedback notification provided through a vibrating element or tactic feedback element of the communications device; or a visual prompt displayed on a display of the communications device. In the case of a video call, the prompt may optionally appear as a graphical overlay element over top of an existing active video call, or the prompt may appear separately in a status bar or on another portion of the display.

Figure 2:
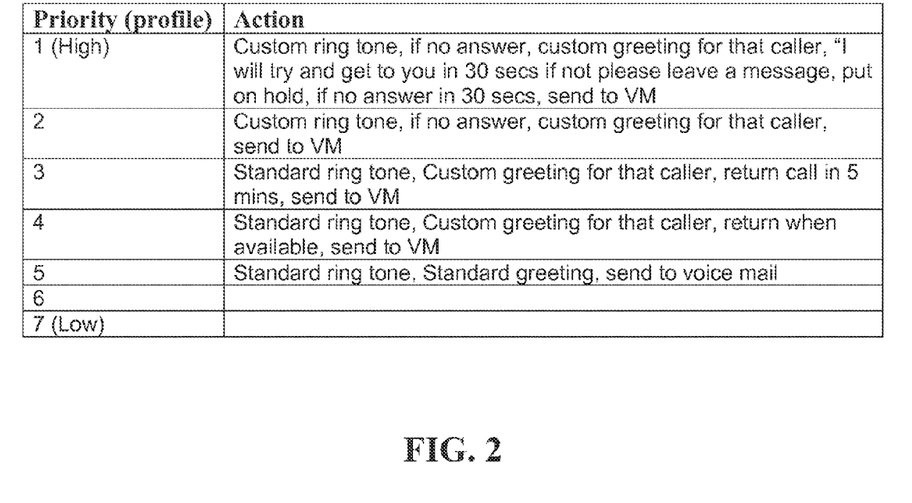
FIG. 2 illustrates a table showing exemplary actions performed by the system of the present invention in accordance with a possible implementation of the invention.
Figure 3:
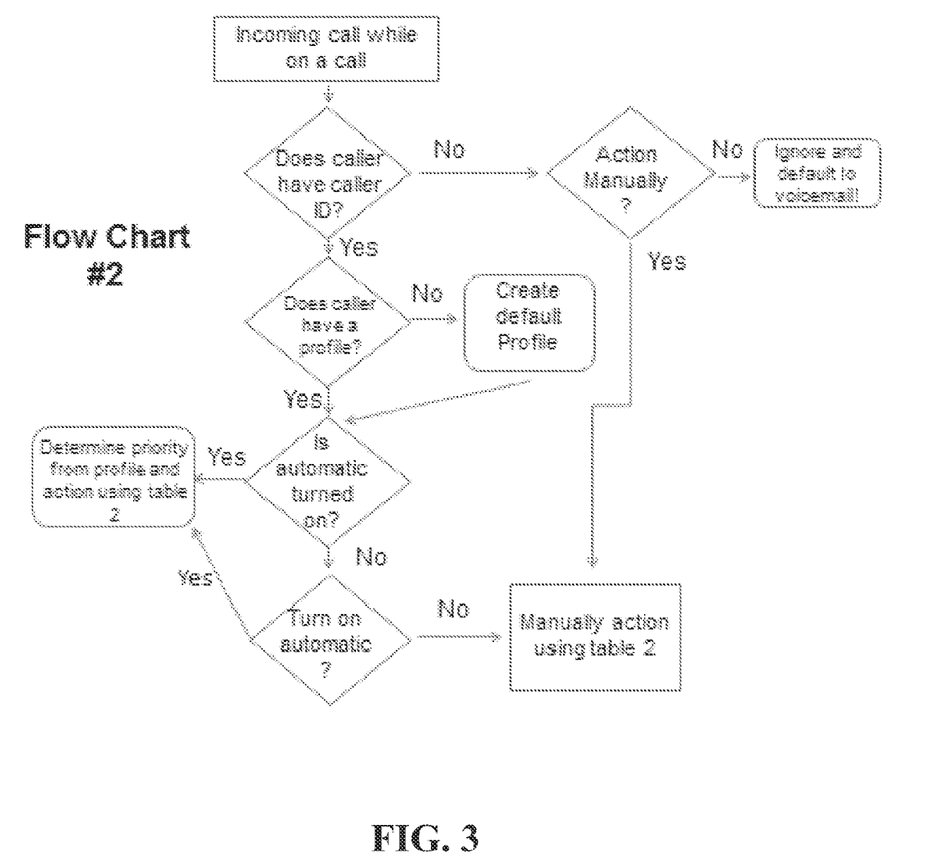
FIG. 3 illustrates an exemplary flow chart of operation of a system in accordance with a possible implementation of the invention.
Figure 4:
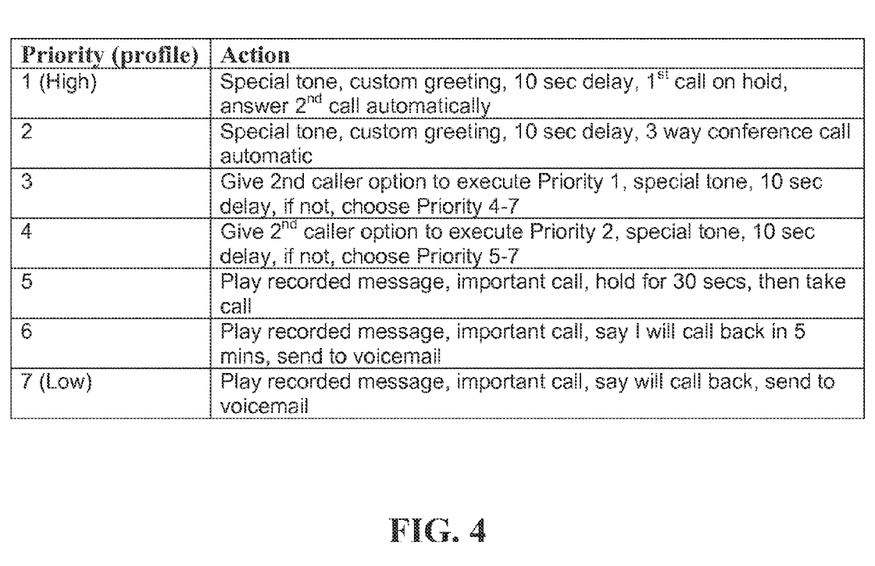
FIG. 4 illustrates a table showing exemplary actions performed by the system of the present invention in accordance with a possible implementation of the invention.

In an implementation, a priority value may be associated with each caller profile, stored either in the profile itself or in other data storage. The system may be configured to respond to an incoming call based on a comparison of the priority value associated with the incoming caller to the priority values of any active call or call already on hold. The system may maintain a plurality of assignable priority values, each priority value corresponding to a priority importance in a hierarchy of priority for incoming calls. Exemplary non-limiting priority values and corresponding actions, or responses, are shown in the tables of FIGS. 2 and 4.

In various non-limiting examples, the system may handle an incoming call in any of the following described non-exhaustive ways.

In one example, the system may play a personalized or predetermined message based on the caller ID data and the respective caller profile.

In another example, the system may maintain a predetermined message associated with a distribution list. Particular caller profiles may be associated with the distribution list. The caller ID data may be checked against the distribution list to determine whether the caller is associated with the list. If so, the system may play the predetermined message. This example may be useful for communicating information to a large group, like a last minute change to a location or time of an event. The user of the system may configure the predetermined message to provide revised event information such that any caller associated with the distribution list calling the communication device may automatically receive the predetermined message without having to speak to the user of the communication device.

In another example, when the communication device is maintaining an active call, and a second call is received, a predetermined message may be played for the second caller to notify of the importance of the call and requesting that the caller wait on hold for a predetermined time, such as 30 seconds. A predetermined message may be associated with each respective caller individually in the respective profiles. The priority value of the caller as indicated in the respective caller profile may also be used by the system to determine the predetermined message and waiting time. While the user is completing the first call, the second caller may be temporarily put on hold. When the user finishes the first call, the system may answer the second call. While maintaining a second caller on hold, the communications device may display an indication of the second caller being on hold, optionally by displaying a list of callers on hold on a portion of the display, or by providing one or more graphical representations of the existence of the caller(s) on hold, optionally through icons or other indicator.

In an implementation, the on hold message may include a menu for example "press 1 to leave a voicemail or press 2 to stay on hold", with the system being configured with corresponding functionality. The on hold message may further include other details such as "press 4 if you can wait 30 seconds only, press 5 if you can wait 1 minute, etc." Various other features are possible such as the ability for the important caller to indicate call back preferences by selection of menu items or even a special voicemail prompt that is priority queued or may be displayed by text message to a display of the communication device used by the called party. Any information received from the caller in response to the on hold message may be relayed to the called party by audio message, tone, vibration or other tactile sensation, or visual display.

In an implementation of the invention, depending on the time indicated to the calling party to wait, the system can also send an update to the called party if the time indicated is about to expire and/or has expired (tone or visual indicator). A further set of commands may enable the called party to send further on hold messages such as "this call is going later—I need 20 more seconds".

In an implementation of the invention, the indication may be presented to the calling party when (a) a particular caller calls, and (b) the called party is on another call and/or (c) the called party has seen that the important caller is calling and has selected application of the on hold message. The indication may include a unique tone or voice message indicating to the calling party that the called party (the user) has engaged the call management functions of the present invention.

In another example, when the communication device is maintaining an active call, and a second call is received, a predetermined message may be played for the second caller to notify that the user is on another call but will call back in a predetermined time, such as 5 minutes. The system may also present the option of the second caller leaving a voicemail message for the user. Optionally, instead of playing the predetermined message, the second caller may be promptly directed to leave a voicemail message for the user. A predetermined message may also be played informing the second caller that the second caller is being forwarded to a voicemail system associated with the user.

In another example, when the communication device is maintaining an active call, and a second call is received, the system may determine from the respective caller profile whether the caller has been granted a priority value above a predetermined level. If so, the system may provide for the second caller to manually signal the user of the communication device with a special ring tone, call waiting tone, or other audio, visual, or tactile indication at the communication device that the second caller is calling. This may be used where the second caller wishes to notify the user of the communication device of an urgent situation or emergency. In the case of a video call, where playing an audio tone may be inappropriate, as the audio tone may be audible to the first caller, optionally a visual notification may be displayed at the display of the communications device. The audio or visual notification may be uniquely associated with the second caller, or may be associated with all callers of a particular priority value. The user may then have the option to manually connect to the second caller. Optionally, the first caller of the active call may be placed on hold or disconnected in order for the user to connect with the second caller. Where the second caller's respective caller profile indicates that the second caller is associated with a priority value above the predetermined level, the system may play a predetermined message notifying the second caller to provide a particular predetermined input to indicate the existence of an urgent situation or emergency to the user. For example, the system may direct the second caller to "press 1 to notify X of an emergency". Where the first caller is placed on hold, the communications device may transmit an indication to the first caller indicating that the user has received another call, and has placed the first caller on hold. In the case of a video call, the communications device may stream a video message to the first caller including this information. In this case of an audio call, the communications device may play an audio message to the first caller including this information, and may optionally repeat the message at predetermined time intervals, such as once every 30 seconds, until the first caller is no longer on hold with the communications device.

In another example, when the communication device is maintaining an active call, and a second call is received, the system may determine from the respective caller profile whether the caller has been granted a priority value above a predetermined level. If so, the system may provide for the second caller to interrupt the active call. The interrupting may include placing the active caller on hold, initiating a 3-way conference call with the user and the active caller, or other method of interruption. This may be used where the user has prioritized the second caller above other callers. Forcing the user to take the second caller's call may be useful where the second caller is in immediate danger, or for any other reason where prompt notification of some information is required between the second caller and the user. The system may be configured to allow for such interruptions to occur only where the second caller has a higher associated priority value than the active caller, or there is a required difference in priority level between the second caller and the active caller. For example, calls may be associated with priority levels such as 1, 2, 3, 4 or 5, 1 being the lowest priority, and 5 being the highest priority. The system may be configured to interrupt a call with a priority level of 3, only if the further incoming call has a priority of 5 or higher. If a first call has a priority of 1, a second call with any higher priority, namely 2, 3, 4, or 5 may interrupt the first call. Various other rules are possible in order to combine priority levels with permissions to interrupt.

The system may also prevent interruptions from occurring where the priority value associated with the active caller is above a particular priority level. Optionally, as placing the active caller on hold without any warning may be confusing or insulting to the active caller, the system may provide for a predetermined time delay, such as 10 seconds, after the second caller has provided input to the system to interrupt the active call before the call will be interrupted. During that time, the system may notify either the user alone, or both the user and the active caller by playing a predetermined message, or through other notification, that the active caller will be placed on hold for the user to accept an urgent call. In either case, the user may then announce to the active caller that the user must accept an urgent call, and will be placing the active caller on hold. The user may then provide some user input, such as pressing a button a keypad of the communication device, or providing input through a touchscreen, or other input device of the system directing the system to either place on hold or disconnect the active call, and make the second call active.

The system may provide for automatic or manual handling of incoming calls based on the respective caller profile. The profile may be initialized or updated manually by the user or automatically by the system based on a variety of information. For example, the system may be configured to automatically update the priority value of the respective caller's profile based on any number of factors, including: (i) frequency of incoming calls for a specific phone number; (ii) frequency of messaging received from a source associated with a caller profile, including short message service ("SMS"), Yahoo, Google, and Blackberry messaging for a specific contact; (iii) frequency of email from a contact, the email address being associated with a caller profile; (iv) subject of email or message received from a source associated with a caller profile, the email or message being flagged by the user or automatically identified by the system as being important or urgent (for example, the system may be configured to look for a particular keyword in an email or message subject or body, and update the respective profile priority value accordingly); (v) frequency of social network activity including message postings on a social network service including Facebook and Twitter; (vi) where the user has flagged a profile as being associated with a family member, colleague, customer, school, deal partner, or other group; and (vii) distribution lists for groups including team sports, charity groups, and project teams. The system may also be configured to allow the user to manually create or update each caller profile with any of the above information, or any other information that may be used by the system to handle incoming calls. Where the user manually creates a profile, the system may provide a recommendation as to the priority value to be associated to the caller profile based on information available to the system, including frequency of communication, subject, social association, or any other factor, including the factors listed previously. Where no such information is available to the system, or by default, optionally pre-set by the user, the system may recommend that the priority value for a new caller profile be a low value, optionally the lowest or second lowest value available to be assigned. The priority value for a respective caller profile may be changed by the user at any time, even where a first time caller is assigned the lowest priority value available. The system may be configured to allow the user to manually assign a caller an initial priority, and when a call is received at the communication device from that caller, the user may be notified and may manually override the caller's assigned priority value at that time, in order for the system to take the action or provide the response associated with the newly assigned priority value. This overriding of the caller priority value may be temporary for the current call only, or may be saved in the caller profile such that future calls from the caller are handled in accordance with the newly assigned priority value. Optionally, once the call has terminated, the system may be configured to prompt the user for input whether to update the respective caller profile with the temporary caller priority value.

In an implementation of the present invention, the system may be configured to create a profile for each entry in a contact list or address book associated with the user available to the system. The caller profiles may be linked to respective contact list or address book entries, or the caller profiles may be managed separately and in parallel to any other repository of caller information available to the system. The profiles may be stored at the computer server, at the communication device, or both.

Figure 1:
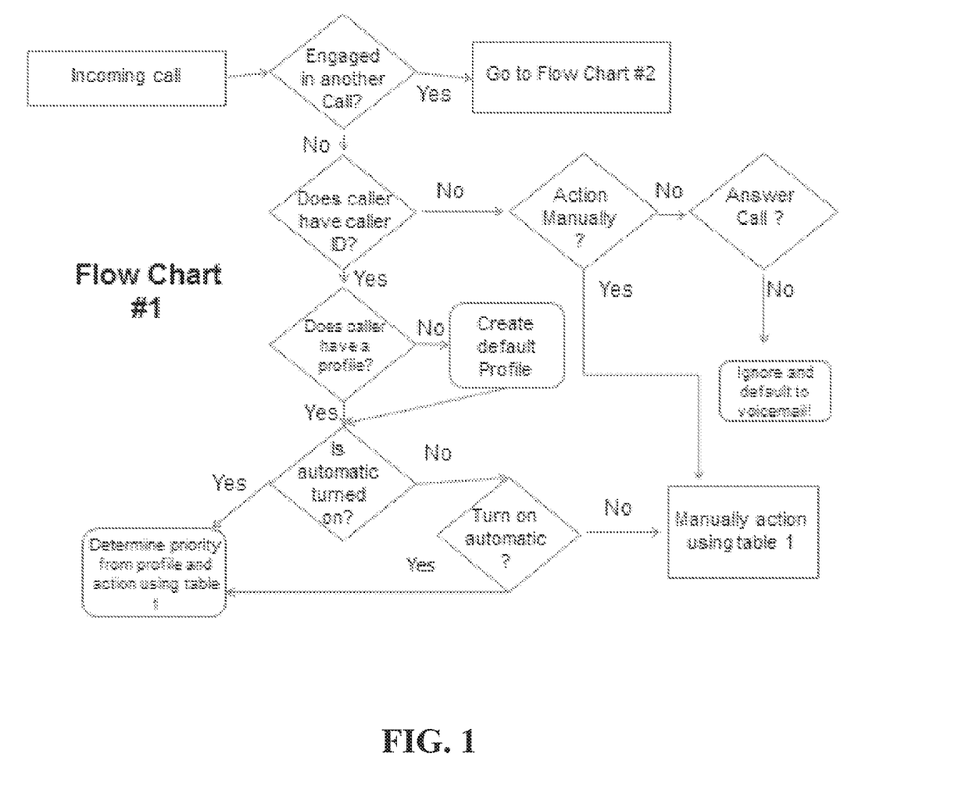
FIG. 1 illustrates an exemplary flow chart of operation of a system in accordance with a possible implementation of the invention.

In accordance with a non-limiting implementation of the present invention, FIGS. 1 and 2 show a possible decision tree for handling a call. When an incoming call is received at communication device, the system may be configured to determine at S10 whether the user is engaged in another call at the communication device. If so, then the system may proceed with to S42 shown in FIG. 2. Otherwise, the system will determine at S12 whether any identifying information about the caller is ascertainable through caller ID. If so, then the system may determine at S14 whether there is a profile associated with the caller at the system. If there is such a profile, the system may query whether automatic call management is enabled at the system at S16. If automatic call management is enabled at the system, the system may be configured to determine the caller priority value from the respective caller profile, and perform an action corresponding to that priority value. A non-limiting example of actions corresponding to priority values which may be suitable for use at S18 is shown in the table of FIG. 2.

If at S12, if the system was not able to ascertain any identifying information about the caller, the system may prompt the user at S20 to ask the user whether the user would like to manually input an action to be used by the system to manage the incoming call. If so, then the system may prompt the user for input specifying an action to take for the incoming caller at S30. This input may be selected from a list of possible options, or the user may manually input all or some aspects of the action at that time.

If at S20, the user provided input to the system that the user did not want to manually input an action to manage the incoming call, the system may prompt the user to answer the call at S22. If the user indicates not to answer the call, or ignores the prompt for a predetermined time, the system may default to voicemail at S24.

If, at S14, the system had identified the caller but determined that there is no profile associated with the caller, the system may, at S26, create a profile based on default settings or other settings, and associate the profile with the caller. The system may then proceed to S16 to continue processing the call in accordance with the profile created at S26.

If, at S16, the system determined that automatic call management is disabled, the system may prompt the user to enable automatic call management at S28. If the user provides input to the system to enable automatic call management, then the system may proceed to S18. Otherwise, the system may prompt the user for input specifying an action to take for the incoming caller at S30. This input may be selected from a list of possible options, or the user may manually input all or some aspects of the action at that time.

If the system determined at S10 that the user is engaged in another call at the communication device when the incoming call is received, the system may proceed to S42, shown in FIG. 2. At S42, the system may determine at S44 whether there is a profile associated with the incoming caller at the system. If there is such a profile, the system may query whether automatic call management is enabled at the system at S46. If automatic call management is enabled at the system, the system may be configured to determine the caller priority value from the respective caller profile, and perform an action corresponding to that priority value. A non-limiting example of actions corresponding to priority values which may be suitable for use at S48 is shown in the table of FIG. 4.

If at S42, if the system was not able to ascertain any identifying information about the caller, the system may prompt the user at S50 to ask the user whether the user would like to manually input an action to be used by the system to manage the incoming call. If so, then the system may prompt the user for input specifying an action to take for the incoming caller at S30. This input may be selected from a list of possible options, or the user may manually input all or some aspects of the action at that time.

If at S50, the user provided input to the system that the user did not want to manually input an action to manage the incoming call, the system may default to voicemail at S54.

If, at S44, the system had identified the caller but determined that there is no profile associated with the caller, the system may, at S56, create a profile based on default settings or other settings, and associate the profile with the caller. The system may then proceed to S46 to continue processing the call in accordance with the profile created at S56.

If, at S46, the system determined that automatic call management is disabled, the system may prompt the user to enable automatic call management at S58. If the user provides input to the system to enable automatic call management, then the system may proceed to S48. Otherwise, the system may prompt the user for input specifying an action to take for the incoming caller at S60. This input may be selected from a list of possible options, or the user may manually input all or some aspects of the action at that time.

In an implementation of the present invention, the system may be implemented through Session Initiated Protocol ("SIP"). SIP may provide for the following: (i) a flexible framework for handshaking between the network infrastructure and the handset; (ii) the establishment of user location (i.e. translating from a user's name to the user's current network address); (iii) feature negotiation so that all of the participants in a session can agree on the features to be supported among them; (iv) call management, for example adding, dropping, or transferring participants from the active call; (v) changing features of a session while the session is in progress.

Depending on the particular implementation and various associated factors such as the resources of the communications device, wireless network parameters, and other factors, different implementation architectures may be used for the present invention.

It should also be understood that the computer server may be implemented as one or more servers in any possible server architecture or configuration including for example in a distributed server architecture, a server farm, or a cloud based computing environment.

Wherever the system is described as receiving input from the user of the communications device, it is to be understood that the input may be received through activation of a physical key on the communications device, through interaction with a touchscreen display of the communications device, through a voice command received at the communications device and processed by the system, through a user gesture observed and processed at the communications device, through physically moving the communications device in a predetermined gesture pattern including shaking the communications device, through receiving data from another local or remote communications device associated with the user, or through any other sensory interaction with the communications device or otherwise controlling the communications device.

Similarly, wherever the system is described as providing an indication to the user or to the incoming caller, the indication may include playing a sound, playing a message, shaking the communications device, temporarily muting output of the communications device, displaying a message, icon, or other visual cue on a display of the communications device, or any other sensory interaction with the communications device.

Figure 5:
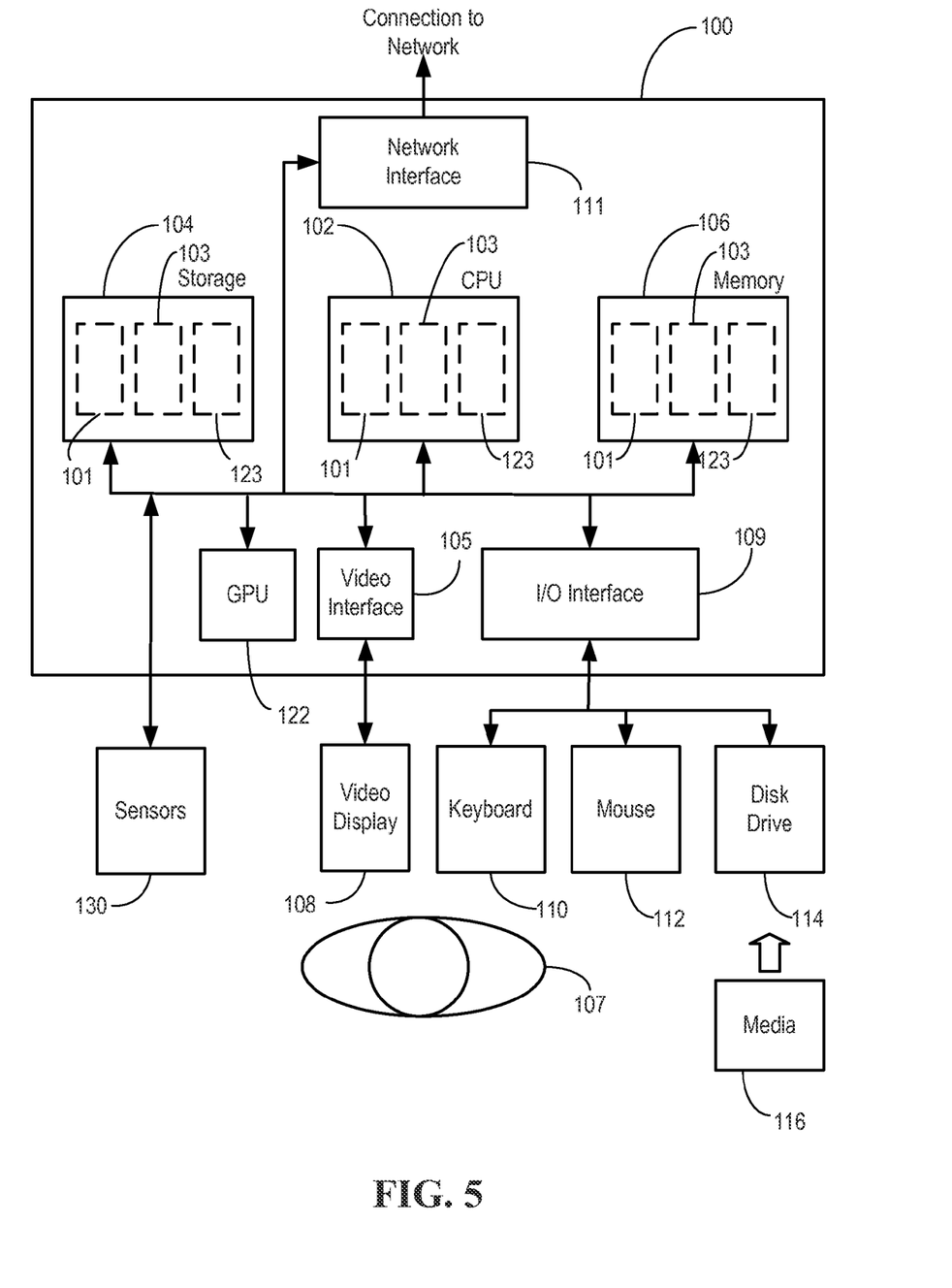
FIG. 5 illustrates an exemplary representative generic implementation of the invention.

The present system and method may be practiced in various embodiments. A suitably configured computer device, and associated communications networks, devices, software and firmware may provide a platform for enabling one or more embodiments as described above. By way of example, FIG. 5 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 130 may be used to receive input from various sources. The video display 108 may be used to display video data signals such as streaming video of a video call received at the communications device.

Figure 6:
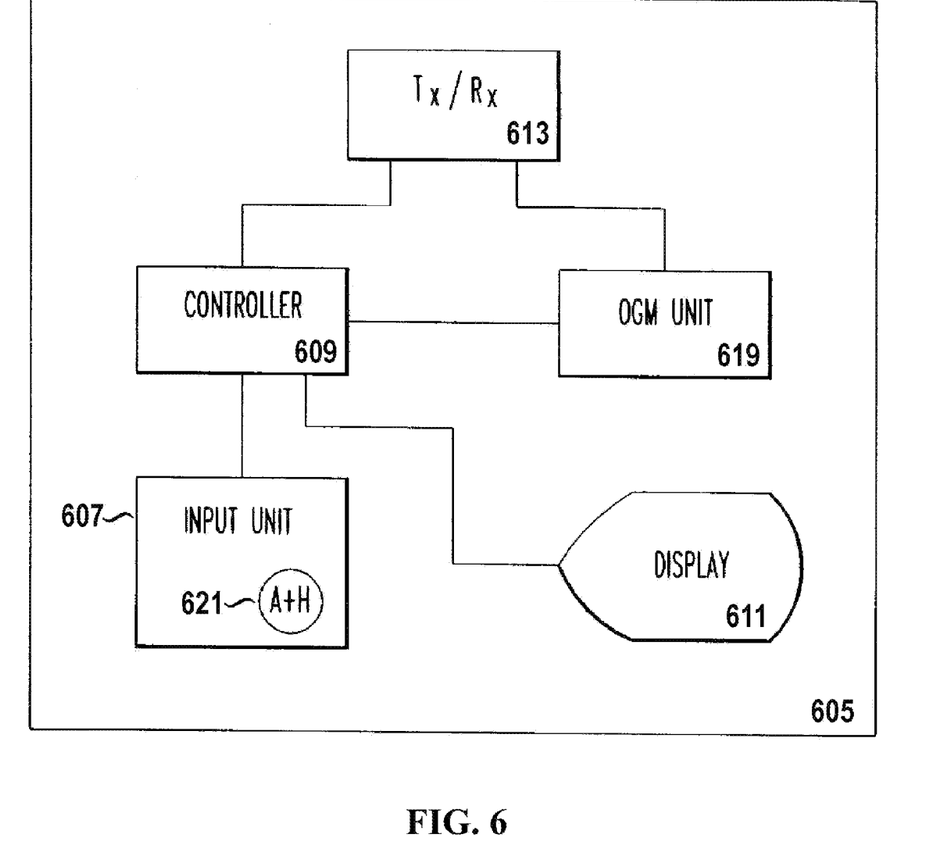
FIG. 6 illustrates an exemplary representative generic implementation of a communications device according to the invention.

In another example, FIG. 6 shows an exemplary simplified block diagram of a communications device 605 according to an aspect of the invention. In this exemplary embodiment, communications device 605 is depicted as a wireless telephone, such as a mobile phone. Communications device may be a wired telephone, a cordless telephone, a mobile or non-mobile computer with telephony hardware and software, a mobile device, or any other type of communications device that can receive incoming calls over a communications network. The communications network may be a wired telephone network, or any type of wireless network. Communications device 605 may include conventional mobile telephone features, such as input unit 607, a controller (such as a microcontroller, digital signal processor, etc.) 609, a display 611, an RF transmitter/receiver 613, and an antenna. Communications device may also include an outgoing message unit 619, and user input 607 may further include an incoming call management unit 621. Operationally, controller 609 may respond to a signal from incoming call management unit 621 to answer an incoming call, cause the outgoing message unit 619 to output a particular outgoing message, and maintain a connection status of the incoming call. The incoming caller may be alerted by the outgoing message, and can remain on the connected call to wait to speak to the user of the communications device 605.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The mobile application of the present invention may be implemented as a web service, where the mobile device includes a link for accessing the web service, rather than a native application.

The functionality described may be implemented to any mobile platform, including the iOS platform, ANDROID™, WINDOWS™ or BLACKBERRY™.

It will be appreciated by those skilled in the art that other variations of the embodiments described herein may also be practiced without departing from the scope of the invention. Other modifications are therefore possible.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A method, performed by one of a communications device and a computer server, the communications device associated with a user and in communication with the computer server over a communications network, comprising:
  receiving an incoming call at the communications device from a second communications device, the incoming call comprising caller identity information;
  determining a correspondence between the caller identity information and a respective caller profile;
  determining a call priority value based on the respective caller profile and comparing the call priority value with a predetermined level; and
  when the call priority value is above the predetermined level:
    transmitting a predetermined message to the second communications device requesting an indication of incoming call importance, the predetermined message based at least partly on the respective caller profile;
    receiving, from the second communications device, incoming call importance data in response to the predetermined message, and
    in accordance with the incoming call importance data received from the second communications device, prioritizing the incoming call in a call queue.

2. The method of claim 1 wherein the prioritizing comprises rendering the incoming call active at the communications device.

3. The method of claim 2 wherein the rendering comprises interrupting an active call at the communications device.

4. The method of claim 3 wherein the interrupting comprises placing the active call on hold.

5. The method of claim 4 wherein the active call comprises a first video call, and the incoming call comprises a second video call, the method comprising providing a video notification to the first video call that the first video call is placed on hold.

6. A method, performed by one of a communications device and a computer server, the communications device associated with a user and in communication with the computer server over a communications network, comprising:
  receiving an incoming call at the communications device from a second communications device, the incoming call comprising caller identity information;
  determining a correspondence between the caller identity information and a respective caller profile;
  determining a call priority value based on the respective caller profile and comparing the call priority value with a predetermined level;
  when the call priority value is above the predetermined level:
    transmitting a predetermined on-hold message to the second communications device, the predetermined on-hold message including an indication of a predetermined on-hold time period, the predetermined on-hold message and the predetermined on-hold time period each based at least partly on the respective caller profile;
    providing a notification at the communications device prior to expiration of the predetermined on-hold time period, based at least partly on the predetermined on-hold time period;
    receiving call management data at the communications device in response to the notification, the call management data representing an action to be taken regarding the incoming call, and
    in accordance with the call management data received at the communications device, transmitting a second predetermined on-hold message to the second communications device.

7. The method of claim 6 wherein the notification includes an indication that the predetermined on-hold time period is expiring.

8. The method of claim 6 comprising prioritizing the incoming call over an active call upon expiration of the predetermined on-hold time period based on the call management data, the prioritizing comprising:
  rendering the incoming call active at the communications device at least partly by interrupting the active call at the communications device; and
  placing the active call on hold.

9. The method of claim 8 wherein the active call comprises a first video call, and the incoming call comprises a second video call, the method comprising providing a video notification to the first video call that the first video call is placed on hold.

10. A method, performed by one of a communications device and a computer server, the communications device associated with a user and in communication with the computer server over a communications network, comprising:

receiving an incoming call at the communications device from a second communications device, the incoming call comprising caller identity information;

determining a correspondence between the caller identity information and a respective caller profile;

determining a call priority value based on the respective caller profile and comparing the call priority value with a predetermined level;

when the call priority value is above the predetermined level:

determining call management data at the communications device based on at least the respective caller profile, the call management data representing an action to be taken regarding the incoming call;

transmitting a predetermined on-hold message to the second communications device based at least partly on the respective caller profile;

providing a notification of the incoming call at the communications device; and in accordance with the call management data received at the communications device, transmitting a second predetermined on-hold message to the second communications device.

11. The method of claim 10 wherein the second predetermined on-hold message comprises an indication that the incoming call is being managed in accordance with the call management data.

12. A method, performed by one of a communications device and a computer server, the mobile device associated with a user and in communication with the computer server over a communications network, comprising:

receiving an incoming call at the communications device from a second communications device, the incoming call comprising caller identity information;

determining a correspondence between the caller identity information and a respective caller profile;

transmitting a predetermined on-hold message to the second communications device, the predetermined on-hold message based at least partly on the respective caller profile;

receiving on-hold preference data from the second communications device;

providing a notification at the communications device of the on-hold preference data; and prioritizing the incoming call in a call queue based at least partly on the on-hold preference data and the respective caller profile.

13. A non-transitory computer readable medium tangibly embodying code that, when executed by a processor of one of a communications device and a computer server, the communications device associated with a user and in communication with the computer server over a communications network, causes the processor to:

receive an incoming call at the communications device from a second communications device, the incoming call comprising caller identity information;

determine a correspondence between the caller identity information and a respective caller profile;

determine a call priority value based on the respective caller profile and compare the call priority value with a predetermined level; and when the call priority value is above the predetermined level:

transmit a predetermined message to the second communications device requesting an indication of incoming call importance, the predetermined message based at least partly on the respective caller profile;

receive, from the second communications device, incoming call importance data in response to the predetermined message, and in accordance with the incoming call importance data received from the second communications device, prioritize the incoming call in a call queue.

14. A system comprising a communications device and a computer server, the communications device associated with a user and in communication with the computer server over a communications network, one of the communications device and the computer server being configured to:

receive an incoming call at the communications device from a second communications device, the incoming call comprising caller identity information;

determine a correspondence between the caller identity information and a respective caller profile;

determine a call priority value based on the respective caller profile and compare the call priority value with a predetermined level; and when the call priority value is above the predetermined level:

transmit a predetermined message to the second communications device requesting an indication of incoming call importance, the predetermined message based at least partly on the respective caller profile;

receive, from the second communications device, incoming call importance data in response to the predetermined message, and in accordance with the incoming call importance data received from the second communications device, prioritize the incoming call in a call queue.

15. A non-transitory computer readable medium tangibly embodying code that, when executed by a processor of one of a communications device and a computer server, the communications device associated with a user and in communication with the computer server over a communications network, causes the processor to:

receive an incoming call at the communications device from a second communications device, the incoming call comprising caller identity information;

determine a correspondence between the caller identity information and a respective caller profile;

determine a call priority value based on the respective caller profile and compare the call priority value with a predetermined level; and when the call priority value is above the predetermined level:

transmit a predetermined on-hold message to the second communications device, the predetermined on-hold message including an indication of a predetermined on-hold time period, the predetermined on-hold message and the predetermined on-hold time period each based at least partly on the respective caller profile;

provide a notification at the communications device prior to expiration of the predetermined on-hold time period, based at least partly on the predetermined on-hold time period;

receive call management data at the communications device in response to the notification, the call management data representing an action to be taken regarding the incoming call, and in accordance with the call management data received at the communications device, transmit a second predetermined on-hold message to the second communications device.

16. A system comprising a communications device and a computer server, the communications device associated with a user and in communication with the computer server over a communications network, one of the communications device and the computer server being configured to:
  receive an incoming call at the communications device from a second communications device, the incoming call comprising caller identity information;
  determine a correspondence between the caller identity information and a respective caller profile;
  determine a call priority value based on the respective caller profile and compare the call priority value with a predetermined level; and
  when the call priority value is above the predetermined level:
    transmit a predetermined on-hold message to the second communications device, the predetermined on-hold message including an indication of a predetermined on-hold time period, the predetermined on-hold message and the predetermined on-hold time period each based at least partly on the respective caller profile;
    provide a notification at the communications device prior to expiration of the predetermined on-hold time period, based at least partly on the predetermined on-hold time period;
    receive call management data at the communications device in response to the notification, the call management data representing an action to be taken regarding the incoming call, and
    in accordance with the call management data received at the communications device, transmit a second predetermined on-hold message to the second communications device.

17. A non-transitory computer readable medium tangibly embodying code that, when executed by a processor of one of a communications device and a computer server, the communications device associated with a user and in communication with the computer server over a communications network, causes the processor to:
  receive an incoming call at the communications device from a second communications device, the incoming call comprising caller identity information;
  determine a correspondence between the caller identity information and a respective caller profile;
  determine a call priority value based on the respective caller profile and compare the call priority value with a predetermined level; and
  when the call priority value is above the predetermined level:
    determine call management data at the communications device based on at least the respective caller profile, the call management data representing an action to be taken regarding the incoming call;
    transmit a predetermined on-hold message to the second communications device based at least partly on the respective caller profile;
    provide a notification of the incoming call at the communications device; and
    in accordance with the call management data received at the communications device, transmit a second predetermined on-hold message to the second communications device.

18. A system comprising a communications device and a computer server, the communications device associated with a user and in communication with the computer server over a communications network, one of the communications device and the computer server being configured to:
  receive an incoming call at the communications device from a second communications device, the incoming call comprising caller identity information;
  determine a correspondence between the caller identity information and a respective caller profile;
  determine a call priority value based on the respective caller profile and compare the call priority value with a predetermined level; and
  when the call priority value is above the predetermined level:
    determine call management data at the communications device based on at least the respective caller profile, the call management data representing an action to be taken regarding the incoming call;
    transmit a predetermined on-hold message to the second communications device based at least partly on the respective caller profile;
    provide a notification of the incoming call at the communications device; and
    in accordance with the call management data received at the communications device, transmit a second predetermined on-hold message to the second communications device.

19. A non-transitory computer readable medium tangibly embodying code that, when executed by a processor of one of a communications device and a computer server, the communications device associated with a user and in communication with the computer server over a communications network, causes the processor to:
  receive an incoming call at the communications device from a second communications device, the incoming call comprising caller identity information;
  determine a correspondence between the caller identity information and a respective caller profile;
  transmit a predetermined on-hold message to the second communications device, the predetermined on-hold message based at least partly on the respective caller profile;
  receive on-hold preference data from the second communications device;
  provide a notification at the communications device of the on-hold preference data; and
  prioritize the incoming call in a call queue based at least partly on the on-hold preference data and the respective caller profile.

20. A system comprising a communications device and a computer server, the communications device associated with a user and in communication with the computer server over a communications network, one of the communications device and the computer server being configured to:
  receive an incoming call at the communications device from a second communications device, the incoming call comprising caller identity information;
  determine a correspondence between the caller identity information and a respective caller profile;
  transmit a predetermined on-hold message to the second communications device, the predetermined on-hold message based at least partly on the respective caller profile;
  receive on-hold preference data from the second communications device;

provide a notification at the communications device of the on-hold preference data; and prioritize the incoming call in a call queue based at least partly on the on-hold preference data and the respective caller profile.

* * * * *